(12) United States Patent
Angelopoulos et al.

(10) Patent No.: US 12,710,983 B2
(45) Date of Patent: Aug. 18, 2026

(54) ALLOCATING COMPUTING RESOURCES FOR A VEHICLE APPLICATION

(71) Applicant: GM Global Technology Operations LLC, Detroit, MI (US)

(72) Inventors: Angelos Angelopoulos, Carrboro, NC (US); Arun Adiththan, Sterling Heights, MI (US); Md Mhafuzul Islam, Warren, MI (US); Paolo Giusto, Brentwood, CA (US); Adi Enzel, Herzliya (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 441 days.

(21) Appl. No.: 18/461,682

(22) Filed: Sep. 6, 2023

(65) Prior Publication Data

US 2025/0077279 A1 Mar. 6, 2025

(51) Int. Cl.
*G06F 9/46* (2006.01)
*G06F 9/48* (2006.01)
*G06F 9/50* (2006.01)

(52) U.S. Cl.
CPC ............ *G06F 9/4887* (2013.01); *G06F 9/505* (2013.01); *G06F 2209/501* (2013.01); *G06F 2209/506* (2013.01); *G06F 2209/509* (2013.01)

(58) Field of Classification Search
CPC ..................................................... G06F 9/4887
USPC .......................................................... 718/104
See application file for complete search history.

(56) References Cited

U.S. PATENT DOCUMENTS

| | | | | |
|---|---|---|---|---|
| 10,628,222 | B2 * | 4/2020 | Liu | G06Q 30/0226 |
| 10,694,399 | B1 * | 6/2020 | Tran | H04W 88/085 |
| 10,705,884 | B2 * | 7/2020 | Altintas | G06F 9/4856 |
| 11,614,962 | B2 * | 3/2023 | Liu | G06F 9/5038 718/102 |
| 12,340,395 | B2 * | 6/2025 | De Angelo | G06Q 30/0269 |
| 2019/0047581 | A1 * | 2/2019 | Bai | G06F 9/5027 |
| 2020/0178198 | A1 * | 6/2020 | Ding | H04W 60/04 |
| 2020/0389410 | A1 * | 12/2020 | Guim Bernat | H04L 67/10 |
| 2021/0099848 | A1 * | 4/2021 | Ruan | H04W 84/042 |
| 2021/0124961 | A1 * | 4/2021 | Simoncini | G06N 20/20 |
| 2021/0181739 | A1 * | 6/2021 | Chen | B60W 40/105 |
| 2021/0209481 | A1 * | 7/2021 | Moradi | G06N 3/04 |
| 2021/0312725 | A1 * | 10/2021 | Milton | G06N 3/098 |
| 2021/0314417 | A1 * | 10/2021 | Chen | H04L 67/59 |

(Continued)

OTHER PUBLICATIONS

Adiththan, A., et al. "Cloud-assisted control of ground vehicles using adaptive computation offloading techniques," IEEE Design, Automation & Test in Europe Conference & Exhibition, 2018, pp. 595-598.

(Continued)

*Primary Examiner* — Mehran Kamran
(74) *Attorney, Agent, or Firm* — Vivacqua Crane, PLLC

(57) ABSTRACT

A method for allocating computing resources for a vehicle includes determining an optimal task configuration for a computing task based at least in part on a task constraint of the computing task. The method further may include determining a criticality level of the computing task based at least in part on the optimal task configuration and the task constraint of the computing task. The method further may include routing the computing task to one of a plurality of remote server systems based at least in part on the criticality level of the computing task.

12 Claims, 3 Drawing Sheets

(56) References Cited

U.S. PATENT DOCUMENTS

| | | | | |
|---|---|---|---|---|
| 2021/0406065 | A1* | 12/2021 | Liu | G06F 9/5038 |
| 2022/0028185 | A1* | 1/2022 | Wang | B60W 40/09 |
| 2022/0032933 | A1* | 2/2022 | Wang | H04L 67/10 |
| 2022/0083391 | A1* | 3/2022 | Liu | G06F 9/5072 |
| 2022/0116456 | A1* | 4/2022 | Higuchi | G06F 9/5044 |
| 2022/0122011 | A1* | 4/2022 | Islam | G06N 20/00 |
| 2022/0167262 | A1* | 5/2022 | Ding | H04L 67/56 |
| 2023/0032183 | A1* | 2/2023 | Kang | H04L 67/1001 |
| 2023/0040264 | A1* | 2/2023 | Hu | G08G 1/0125 |
| 2023/0153378 | A1* | 5/2023 | Huang | G06V 10/95<br>382/103 |
| 2023/0269766 | A1* | 8/2023 | Guo | H04L 67/12<br>370/329 |
| 2024/0127105 | A1* | 4/2024 | Chen | G06V 20/56 |
| 2024/0174254 | A1* | 5/2024 | Chen | G06F 18/214 |
| 2024/0414050 | A1* | 12/2024 | Sorrentino | H04L 41/0816 |
| 2025/0077279 | A1* | 3/2025 | Angelopoulos | G06F 9/4887 |
| 2025/0077304 | A1* | 3/2025 | Nair | G06F 9/5083 |
| 2025/0165311 | A1* | 5/2025 | Liu | G06F 9/5094 |

OTHER PUBLICATIONS

Ashok, A., et al. "Adaptive Cloud Offloading for Vehicular Applications," IEEE Vehicular Networking Conference, 2016, pp. 1-8.

* cited by examiner

ALLOCATING COMPUTING RESOURCES FOR A VEHICLE APPLICATION

INTRODUCTION

The present disclosure relates to systems and methods for allocating computing resources for a vehicle, and more particularly, to systems and methods for optimizing offloading of computing tasks to remote computing resources.

To increase occupant awareness and convenience, vehicles may be equipped with various sensors and systems such as, for example, perception sensors (e.g., camera, radar, ultrasonic distance sensors, and/or the like), microphones, navigation systems, advanced driver assistance systems (ADAS), automated driving systems (ADS), and/or the like. Such sensors and systems may produce data requiring execution of further computational tasks, such as, for example, computer vision processing, video processing, natural language processing, voice recognition, navigation routing, automated driving path planning, and/or the like. Therefore, computational tasks may be offloaded to remote computing resources (e.g., a remote datacenter). However, current offloading systems and methods may not account for variations in factors such as, for example, computational task time-sensitivity, computational task performance parameters and constraints, network conditions, and/or the like. As a result, current offloading systems may not optimally allocate remote computing resources.

Thus, while current vehicle computation systems and methods achieve their intended purpose, there is a need for a new and improved system and method for allocating computing resources for a vehicle.

SUMMARY

According to several aspects, a method for allocating computing resources for a vehicle is provided. The method may include determining an optimal task configuration for a computing task based at least in part on a task constraint of the computing task. The method further may include determining a criticality level of the computing task based at least in part on the optimal task configuration and the task constraint of the computing task. The method further may include routing the computing task to one of a plurality of remote server systems based at least in part on the criticality level of the computing task.

In another aspect of the present disclosure, determining the optimal task configuration further may include determining a predicted performance of the computing task based at least in part on a task configuration of the computing task. Determining the optimal task configuration further may include comparing the predicted performance of the computing task to the task constraint of the computing task. Determining the optimal task configuration further may include modifying the task configuration of the computing task in response to determining that the predicted performance of the computing task does not satisfy the task constraint of the computing task. Determining the optimal task configuration further may include repeating the determining the predicted performance step, the comparing the predicted performance step, and the modifying the task configuration step until the optimal task configuration is identified. The predicted performance of the computing task with the optimal task configuration satisfies the task constraint of the computing task.

In another aspect of the present disclosure, determining the predicted performance of the computing task further may include determining the predicted performance of the computing task using a vehicle specific offloading machine learning model. The vehicle specific offloading machine learning model is configured to receive the task configuration of the computing task and historical vehicle specific task performance data as an input. The vehicle specific offloading machine learning model is configured to provide the predicted performance of the computing task as an output.

In another aspect of the present disclosure, the method further may include training the vehicle specific offloading machine learning model. Training the vehicle specific offloading machine learning model further may include training a global offloading machine learning model based at least in part on historical global task performance data. The global offloading machine learning model is trained using one of the plurality of remote server systems. Training the vehicle specific offloading machine learning model further may include deploying the global offloading machine learning model from the one of the plurality of remote server systems to a vehicle controller of the vehicle. Training the vehicle specific offloading machine learning model further may include training the vehicle specific offloading machine learning model based at least in part on the global offloading machine learning model using the vehicle controller. The vehicle specific offloading machine learning model is trained using remote learning.

In another aspect of the present disclosure, training the vehicle specific offloading machine learning model based at least in part on the global offloading machine learning model further may include training the global offloading machine learning model with historical vehicle specific task performance data to produce the vehicle specific offloading machine learning model.

In another aspect of the present disclosure, the historical global task performance data includes at least one of: a plurality of end-to-end roundtrip latencies of previously completed computing tasks from a plurality of vehicles and network performance data for a plurality of network connections between the plurality of vehicles and the plurality of remote server systems. The historical vehicle specific task performance data includes at least one of: a plurality of end-to-end roundtrip latencies of previously completed computing tasks from the vehicle and network performance data for a network connection between the vehicle and the plurality of remote server systems.

In another aspect of the present disclosure, modifying the task configuration of the computing task further may include modifying the task configuration of the computing task using the vehicle specific offloading machine learning model. The vehicle specific offloading machine learning model is further configured to receive the task constraint of the computing task as the input and provide a modified task configuration for the computing task as the output.

In another aspect of the present disclosure, determining the criticality level of the computing task further may include determining the criticality level of the computing task based at least in part on the predicted performance of the computing task with the optimal task configuration. The criticality level includes one of: a low criticality level, a normal criticality level, a high criticality level, and a very high criticality level. Determining the criticality level of the computing task further may include comparing the criticality level to an allowed criticality level of the task constraint. Determining the criticality level of the computing task further may include modifying the criticality level in response to determining that the criticality level does not satisfy the allowed criticality level.

In another aspect of the present disclosure, routing the computing task to one of the plurality of remote server systems further may include routing the computing task to a first of the plurality of remote server systems in response to determining that the criticality level of the computing task is the low criticality level. The first of the plurality of remote server systems is configured to provide a first throughput and a first latency. Routing the computing task to one of the plurality of remote server systems further may include routing the computing task to a second of the plurality of remote server systems in response to determining that the criticality level of the computing task is the normal criticality level. The second of the plurality of remote server systems is configured to provide the first throughput and a second latency. The second latency is less than the first latency. Routing the computing task to one of the plurality of remote server systems further may include routing the computing task to a third of the plurality of remote server systems in response to determining that the criticality level of the computing task is the high criticality level. The third of the plurality of remote server systems is configured to provide a second throughput and the second latency. The second throughput is less than the first throughput. Routing the computing task to one of the plurality of remote server systems further may include routing the computing task to a fourth of the plurality of remote server systems in response to determining that the criticality level of the computing task is the very high criticality level. The fourth of the plurality of remote server systems is configured to provide the second throughput and a third latency. The third latency is less than the second latency.

In another aspect of the present disclosure, the task constraint of the computing task includes at least a maximum end-to-end roundtrip latency for the computing task.

According to several aspects, a system for allocating computing resources for a vehicle is provided. The system may include a plurality of remote server systems and a vehicle system. The vehicle system may include a vehicle communication system in wireless communication with the remote server system and a vehicle controller in electrical communication with the vehicle communication system. The vehicle controller is programmed to determine an optimal task configuration for a computing task based at least in part on a task constraint of the computing task. The vehicle controller is further programmed to determine a criticality level of the computing task based at least in part on the optimal task configuration and the task constraint of the computing task. The vehicle controller is further programmed to route the computing task to one of the plurality of remote server systems using the vehicle communication system based at least in part on the criticality level of the computing task.

In another aspect of the present disclosure, to determine the optimal task configuration, the vehicle controller is further programmed to determine a predicted performance of the computing task using a vehicle specific offloading machine learning model. The vehicle specific offloading machine learning model is configured to receive a task configuration of the computing task and historical vehicle specific task performance data as an input. The vehicle specific offloading machine learning model is configured to provide the predicted performance of the computing task as an output. To determine the optimal task configuration, the vehicle controller is further programmed to compare the predicted performance of the computing task to the task constraint of the computing task. To determine the optimal task configuration, the vehicle controller is further programmed to modify the task configuration of the computing task in response to determining that the predicted performance of the computing task does not satisfy the task constraint of the computing task.

In another aspect of the present disclosure, to modify the task configuration of the computing task, the vehicle controller is further programmed to modify the task configuration of the computing task using the vehicle specific offloading machine learning model. The vehicle specific offloading machine learning model is further configured to receive the task constraint of the computing task as the input and provide a modified task configuration for the computing task as the output.

In another aspect of the present disclosure, the plurality of remote server systems includes at least one server controller and at least one server communication system in electrical communication with the at least one server controller. The at least one server controller is programmed to train a global offloading machine learning model based at least in part on historical global task performance data. The at least one server controller is further programmed to transmit the global offloading machine learning model from the at least one server controller to the vehicle communication system using the at least one server communication system.

In another aspect of the present disclosure, the vehicle controller is further programmed to receive the global offloading machine learning model using the vehicle communication system. The vehicle controller is further programmed to train the vehicle specific offloading machine learning model based at least in part on the global offloading machine learning model using the vehicle controller. The vehicle specific offloading machine learning model is trained using remote learning.

In another aspect of the present disclosure, to determine the criticality level of the computing task, the vehicle controller is further programmed to determine the criticality level of the computing task based at least in part on the predicted performance of the computing task with the optimal task configuration. The criticality level includes one of: a low criticality level, a normal criticality level, a high criticality level, and a very high criticality level.

In another aspect of the present disclosure, the plurality of remote server systems further may include a first remote server system configured to provide a first throughput and a first latency. The plurality of remote server systems further may include a second remote server system configured to provide the first throughput and a second latency. The second latency is less than the first latency. The plurality of remote server systems further may include a third remote server system configured to provide a second throughput and the second latency. The second throughput is less than the first throughput. The plurality of remote server systems further may include a fourth remote server system configured to provide the second throughput and a third latency. The third latency is less than the second latency. To route the computing task, the vehicle controller is further programmed to route the computing task to the first remote server system in response to determining that the criticality level of the computing task is the low criticality level. To route the computing task, the vehicle controller is further programmed to route the computing task to the second remote server system in response to determining that the criticality level of the computing task is the normal criticality level. To route the computing task, the vehicle controller is further programmed to route the computing task to the third remote server system in response to determining that the criticality level of the computing task is the high criticality level. To route the computing task, the vehicle controller is further programmed to route the computing task to the fourth remote server system in response to determining that the criticality level of the computing task is the very high criticality level.

According to several aspects, a system for allocating computing resources for a vehicle is provided. The system for allocating computing resources for a vehicle may include a plurality of remote server systems. The plurality of remote server systems includes a server communication system and a server controller in electrical communication with the server communication system. The server controller is programmed to train a global offloading machine learning model based at least in part on historical global task performance data. The server controller is further programmed to transmit the global offloading machine learning model using the server communication system. The system for allocating computing resources for a vehicle further may include a vehicle system. The vehicle system includes a vehicle communication system in wireless communication with the server communication system and a vehicle controller in electrical communication with the vehicle communication system. The vehicle controller is programmed to receive the global offloading machine learning model using the vehicle communication system. The vehicle controller is further programmed to train a vehicle specific offloading machine learning model based at least in part on the global offloading machine learning model using the vehicle controller. The vehicle controller is further programmed to determine an optimal task configuration for a computing task using the vehicle specific offloading machine learning model based at least in part on a task constraint of the computing task. The vehicle controller is further programmed to determine a criticality level of the computing task based at least in part on the optimal task configuration and the task constraint of the computing task. The criticality level includes one of: a low criticality level, a normal criticality level, a high criticality level, and a very high criticality level. The vehicle controller is further programmed to route the computing task to one of the plurality of remote server systems using the vehicle communication system based at least in part on the criticality level of the computing task.

In another aspect of the present disclosure, to determine the optimal task configuration, the vehicle controller is further programmed to determine the predicted performance of the computing task using the vehicle specific offloading machine learning model. The vehicle specific offloading machine learning model is configured to receive a task configuration of the computing task and historical vehicle specific task performance data as an input. The vehicle specific offloading machine learning model is configured to provide the predicted performance of the computing task as an output. To determine the optimal task configuration, the vehicle controller is further programmed to compare the predicted performance of the computing task to the task constraint of the computing task. To determine the optimal task configuration, the vehicle controller is further programmed to modify the task configuration of the computing task in response to determining that the predicted performance of the computing task does not satisfy the task constraint of the computing task. The task configuration of the computing task is modified using the vehicle specific offloading machine learning model. The vehicle specific offloading machine learning model is further configured to receive the task constraint of the computing task as the input and provide a modified task configuration for the computing task as the output.

In another aspect of the present disclosure, the plurality of remote server systems further may include a first remote server system configured to provide a first throughput and a first latency. The plurality of remote server systems further may include a second remote server system configured to provide the first throughput and a second latency. The second latency is less than the first latency. The plurality of remote server systems further may include a third remote server system configured to provide a second throughput and the second latency. The second throughput is less than the first throughput. The plurality of remote server systems further may include a fourth remote server system configured to provide the second throughput and a third latency. The third latency is less than the second latency. To route the computing task, the vehicle controller is further programmed to route the computing task to the first remote server system in response to determining that the criticality level of the computing task is the low criticality level. To route the computing task, the vehicle controller is further programmed to route the computing task to the second remote server system in response to determining that the criticality level of the computing task is the normal criticality level. To route the computing task, the vehicle controller is further programmed to route the computing task to the third remote server system in response to determining that the criticality level of the computing task is the high criticality level. To route the computing task, the vehicle controller is further programmed to route the computing task to the fourth remote server system in response to determining that the criticality level of the computing task is the very high criticality level.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Vehicle systems may be configured to perform computing tasks related to an operation of the vehicle, such as, for example, computer vision tasks (e.g., object recognition of objects in the environment surrounding the vehicle), video processing tasks (e.g., video encoding, video compression, and/or the like), natural language processing tasks (e.g., parsing and interpretation of traffic sign text), voice recognition tasks, navigation routing tasks, automated driving path planning tasks, and/or the like. In some examples, it is advantageous to offload execution of one or more computing tasks from the vehicle to one or more remote computing resources. Accordingly, the present disclosure provides a new and improved system and method for allocating computing resources for a vehicle including optimizing offloading of computing tasks to remote computing resources.

Figure 1:
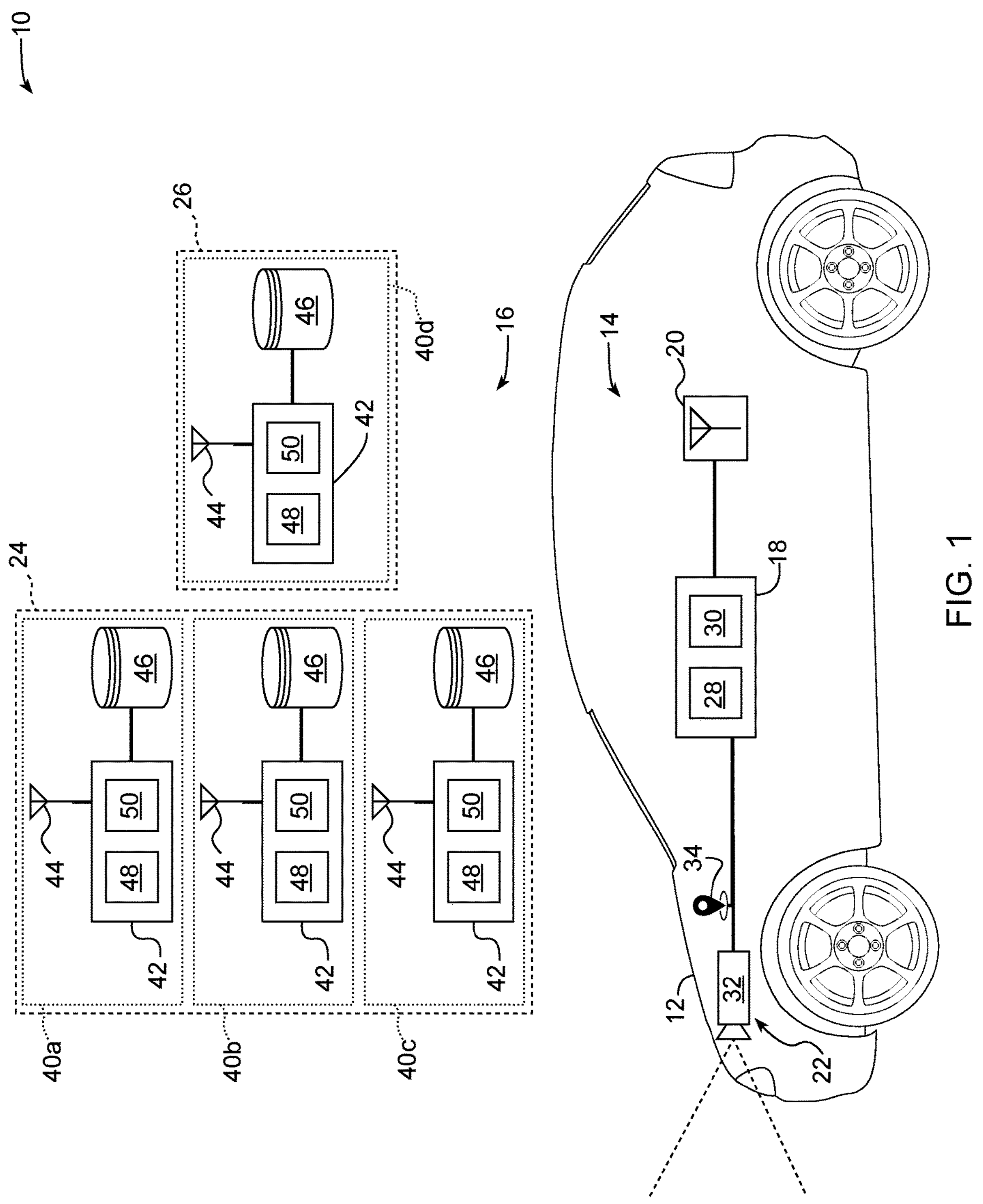
FIG. 1 is a schematic diagram of a system for allocating computing resources for a vehicle, according to an exemplary embodiment.

Referring to FIG. 1, a system for allocating computing resources for a vehicle is illustrated and generally indicated by reference number 10. The system 10 is shown with an exemplary vehicle 12. While a passenger vehicle is illustrated, it should be appreciated that the vehicle 12 may be any type of vehicle, including, for example, a utility vehicle, a taxi, a van and/or an automated vehicle using any SAE automation level, without departing from the scope of the present disclosure. The system 10 generally includes a vehicle system 14 and a plurality of remote server systems 16. The vehicle system 14 includes a vehicle controller 18, a vehicle communication system 20, and a plurality of vehicle sensors 22. The plurality of remote server systems 16 includes a cloud computing server system 24 and an edge computing server system 26.

The vehicle controller 18 is used to implement a method 100 for allocating computing resources for a vehicle, as will be described below. The vehicle controller 18 includes at least one processor 28 and a non-transitory computer readable storage device or media 30. The processor 28 may be a custom made or commercially available processor, a central processing unit (CPU), a graphics processing unit (GPU), an auxiliary processor among several processors associated with the vehicle controller 18, a semiconductor-based microprocessor (in the form of a microchip or chip set), a macroprocessor, a combination thereof, or generally a device for executing instructions. The computer readable storage device or media 30 may include volatile and non-volatile storage in read-only memory (ROM), random-access memory (RAM), and keep-alive memory (KAM), for example. KAM is a persistent or non-volatile memory that may be used to store various operating variables while the processor 28 is powered down. The computer-readable storage device or media 30 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the vehicle controller 18 to control various systems of the vehicle 12. The vehicle controller 18 may also consist of multiple controllers which are in electrical communication with each other. The vehicle controller 18 may be inter-connected with additional systems and/or controllers of the vehicle 12, allowing the vehicle controller 18 to access data such as, for example, speed, acceleration, braking, and steering angle of the vehicle 12.

The vehicle controller 18 is in electrical communication with the vehicle communication system 20 and the plurality of vehicle sensors 22. In an exemplary embodiment, the electrical communication is established using, for example, a CAN network, a FLEXRAY network, a local area network (e.g., WiFi, ethernet, and the like), a serial peripheral interface (SPI) network, or the like. It should be understood that various additional wired and wireless techniques and communication protocols for communicating with the vehicle controller 18 are within the scope of the present disclosure.

The vehicle communication system 20 is used by the vehicle controller 18 to communicate with other systems external to the vehicle 12. For example, the vehicle communication system 20 includes capabilities for communication with vehicles ("V2V" communication), infrastructure ("V2I" communication), remote systems at a remote call center (e.g., ON-STAR by GENERAL MOTORS) and/or personal devices. In general, the term vehicle-to-everything communication ("V2X" communication) refers to communication between the vehicle 12 and any remote system (e.g., vehicles, infrastructure, and/or remote systems). In certain embodiments, the vehicle communication system 20 is a wireless communication system configured to communicate via a wireless local area network (WLAN) using IEEE 802.11 standards or by using cellular data communication (e.g., using GSMA standards, such as, for example, SGP.02, SGP.22, SGP.32, and the like). Accordingly, the vehicle communication system 20 may further include an embedded universal integrated circuit card (eUICC) configured to store at least one cellular connectivity configuration profile, for example, an embedded subscriber identity module (eSIM) profile. The vehicle communication system 20 is further configured to communicate via a personal area network (e.g., BLUETOOTH) and/or near-field communication (NFC). However, additional or alternate communication methods, such as a dedicated short-range communications (DSRC) channel and/or mobile telecommunications protocols based on the 3rd Generation Partnership Project (3GPP) standards, are also considered within the scope of the present disclosure. DSRC channels refer to one-way or two-way short-range to medium-range wireless communication channels specifically designed for automotive use and a corresponding set of protocols and standards. The 3GPP refers to a partnership between several standards organizations which develop protocols and standards for mobile telecommunications. 3GPP standards are structured as "releases". Thus, communication methods based on 3GPP release 16, 15, 16 and/or future 3GPP releases are considered within the scope of the present disclosure. Accordingly, the vehicle communication system 20 may include one or more antennas and/or communication transceivers for receiving and/or transmitting signals, such as cooperative sensing messages (CSMs). The vehicle communication system 20 is configured to wirelessly communicate information between the vehicle 12 and another vehicle. Further, the vehicle communication system 20 is configured to wirelessly communicate information between the vehicle 12 and infrastructure or other vehicles. It should be understood that the vehicle communication system 20 may be integrated with the vehicle controller 18 (e.g., on a same circuit board with the vehicle controller 18 or otherwise a part of the vehicle controller 18) without departing from the scope of the present disclosure.

The plurality of vehicle sensors 22 are used to acquire information relevant to the vehicle 12. In an exemplary embodiment, the plurality of vehicle sensors 22 includes at least a camera system 32 and a global navigation satellite system (GNSS) 34.

In another exemplary embodiment, the plurality of vehicle sensors 22 further includes sensors to determine performance data about the vehicle 12. In a non-limiting example, the plurality of vehicle sensors 22 further includes at least one of a motor speed sensor, a motor torque sensor, an electric drive motor voltage and/or current sensor, an accelerator pedal position sensor, a brake position sensor, a coolant temperature sensor, a cooling fan speed sensor, and a transmission oil temperature sensor.

In another exemplary embodiment, the plurality of vehicle sensors 22 further includes sensors to determine information about an environment within the vehicle 12. In a non-limiting example, the plurality of vehicle sensors 22 further includes at least one of a seat occupancy sensor, a cabin air temperature sensor, a cabin motion detection sensor, a cabin camera, a cabin microphone, and/or the like.

In another exemplary embodiment, the plurality of vehicle sensors 22 further includes sensors to determine information about an environment surrounding the vehicle 12. In a non-limiting example, the plurality of vehicle sensors 22 further includes at least one of an ambient air temperature sensor, a barometric pressure sensor, and/or a photo and/or video camera which is positioned to view the environment in front of the vehicle 12.

In another exemplary embodiment, at least one of the plurality of vehicle sensors 22 is a perception sensor capable of perceiving objects and/or measuring distances in the environment surrounding the vehicle 12. In a non-limiting example, the plurality of vehicle sensors 22 includes a stereoscopic camera having distance measurement capabilities. In one example, at least one of the plurality of vehicle sensors 22 is affixed inside of the vehicle 12, for example, in a headliner of the vehicle 12, having a view through a windscreen of the vehicle 12. In another example, at least one of the plurality of vehicle sensors 22 is affixed outside of the vehicle 12, for example, on a roof of the vehicle 12, having a view of the environment surrounding the vehicle 12. It should be understood that various additional types of perception sensors, such as, for example, camera sensors, LiDAR sensors, ultrasonic ranging sensors, radar sensors, and/or time-of-flight sensors are within the scope of the present disclosure. The plurality of vehicle sensors 22 are in electrical communication with the vehicle controller 18 as discussed above.

The camera system 32 is a perception sensor used to capture images and/or videos of the environment surrounding the vehicle 12. In an exemplary embodiment, the camera system 32 includes a photo and/or video camera which is positioned to view the environment surrounding the vehicle 12. In a non-limiting example, the camera system 32 includes a camera affixed inside of the vehicle 12, for example, in a headliner of the vehicle 12, having a view through the windscreen. In another non-limiting example, the camera system 32 includes a camera affixed outside of the vehicle 12, for example, on a roof of the vehicle 12, having a view of the environment in front of the vehicle 12.

In another exemplary embodiment, the camera system 32 is a surround view camera system including a plurality of cameras (also known as satellite cameras) arranged to provide a view of the environment adjacent to all sides of the vehicle 12. In a non-limiting example, the camera system 32 includes a front-facing camera (mounted, for example, in a front grille of the vehicle 12), a rear-facing camera (mounted, for example, on a rear tailgate of the vehicle 12), and two side-facing cameras (mounted, for example, under each of two side-view mirrors of the vehicle 12). In another non-limiting example, the camera system 32 further includes an additional rear-view camera mounted near a center high mounted stop lamp of the vehicle 12.

It should be understood that camera systems having additional cameras and/or additional mounting locations are within the scope of the present disclosure. It should further be understood that cameras having various sensor types including, for example, charge-coupled device (CCD) sensors, complementary metal oxide semiconductor (CMOS) sensors, and/or high dynamic range (HDR) sensors are within the scope of the present disclosure. Furthermore, cameras having various lens types including, for example, wide-angle lenses and/or narrow-angle lenses are also within the scope of the present disclosure.

The GNSS 34 is used to determine a geographical location of the vehicle 12. In an exemplary embodiment, the GNSS 34 is a global positioning system (GPS). In a non-limiting example, the GPS includes a GPS receiver antenna (not shown) and a GPS controller (not shown) in electrical communication with the GPS receiver antenna. The GPS receiver antenna receives signals from a plurality of satellites, and the GPS controller calculates the geographical location of the vehicle 12 based on the signals received by the GPS receiver antenna. In an exemplary embodiment, the GNSS 34 additionally includes a map. The map includes information about infrastructure such as municipality borders, roadways, railways, sidewalks, buildings, and the like. Therefore, the geographical location of the vehicle 12 is contextualized using the map information. In a non-limiting example, the map is retrieved from a remote source using a wireless connection. In another non-limiting example, the map is stored in a database of the GNSS 34. It should be understood that various additional types of satellite-based radionavigation systems, such as, for example, the Global Positioning System (GPS), Galileo, GLONASS, and the BeiDou Navigation Satellite System (BDS) are within the scope of the present disclosure. It should be understood that the GNSS 34 may be integrated with the vehicle controller 18 (e.g., on a same circuit board with the vehicle controller 18 or otherwise a part of the vehicle controller 18) without departing from the scope of the present disclosure.

The cloud computing server system 24 is used to perform computing tasks sent from the vehicle 12. In an exemplary embodiment, the cloud computing server system 24 is located in a regional datacenter. In an exemplary embodiment, the cloud computing server system 24 includes a first remote server system **40*a*, a second remote server system 40*b*, and a third remote server system 40*c*. In an exemplary embodiment, each of the first remote server system 40*a*, the second remote server system 40*b*, and the third remote server system 40*c* are configured with different performance capabilities. In an exemplary embodiment, the first remote server system 40*a* is configured for high-throughput and high-latency performance. High-throughput refers to a number of computing tasks which the first remote server system 40*a* is capable of simultaneously performing. In a non-limiting example, the first remote server system 40*a* is capable of completing thousands of computing tasks simultaneously (e.g., 2000 simultaneous computing tasks). High-latency refers to a speed at which the first remote server system 40*a* is capable of completing computing tasks. In a non-limiting example, the first remote server system 40*a*** is capable of completing each computing task in hundreds of milliseconds (e.g., 100 milliseconds).

In an exemplary embodiment, the second remote server system **40*b* is configured for high-throughput and medium-latency performance. Medium-latency refers to a speed at which the second remote server system 40*b* is capable of completing computing tasks. In a non-limiting example, the second remote server system 40*b*** is capable of completing each computing task in tens of milliseconds (e.g., 50 milliseconds).

In an exemplary embodiment, the third remote server system **40*c* is configured for low-throughput and medium-latency performance. Low-throughput refers to a number of computing tasks which the third remote server system 40*c* is capable of simultaneously performing. In a non-limiting example, the third remote server system 40***c* is capable of completing tens of computing tasks simultaneously (e.g., 20 simultaneous computing tasks).

The edge computing server system 26 is used to perform computing tasks sent from the vehicle 12. In an exemplary embodiment, the edge computing server system 26 is located in a local datacenter. In a non-limiting example, the edge computing server system 26 is located near roadways or other populated areas, such as, for example, on telephone poles, on cellular towers, integrated into traffic control devices (e.g., a traffic light control device), and/or the like. Computing systems like the edge computing server system 26 are sometimes also referred to as roadside units (RSUs). In an exemplary embodiment, the edge computing server system 26 includes a fourth remote server system 40*d*. In an exemplary embodiment, the fourth remote server system 40*d* is configured with different performance capabilities from the first remote server system 40*a*, the second remote server system 40*b*, and the third remote server system 40*c*. In an exemplary embodiment, the fourth remote server system 40*d* is configured for low-throughput and low-latency performance. Low-latency refers to a speed at which the fourth remote server system 40*d* is capable of completing computing tasks. In a non-limiting example, the fourth remote server system 40*d* is capable of completing each computing task in milliseconds (e.g., 5 milliseconds).

Each of the first remote server system 40*a*, the second remote server system 40*b*, the third remote server system 40*c*, and the fourth remote server system 40*d* has a server controller 42, a server communication system 44, and a server storage device 46. The server controller 42 includes at least one server processor 48 and a non-transitory computer readable storage device or server media 50. The server processor 48 may be a custom made or commercially available processor, a central processing unit (CPU), a graphics processing unit (GPU), an auxiliary processor among several processors associated with the server controller 42, a semiconductor-based microprocessor (in the form of a microchip or chip set), a macroprocessor, a combination thereof, or generally a device for executing instructions. The computer readable storage device or server media 50 may include volatile and nonvolatile storage in read-only memory (ROM), random-access memory (RAM), and keep-alive memory (KAM), for example. KAM is a persistent or non-volatile memory that may be used to store various operating variables while the server processor 48 is powered down. The computer-readable storage device or server media 50 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the server controller 42.

The server storage device 46 is used to store computing task information for later retrieval. In an exemplary embodiment, the server storage device 46 is a non-volatile, persistent storage medium, such as, for example, a hard disk drive, a magnetic tape drive, a solid-state drive, and the like. In a non-limiting example, the server storage device 46 includes a solid-state drive (SSD) utilizing NAND flash to store digital data. In another non-limiting example, the server storage device 46 includes a hard-disk drive (HDD) utilizing a magnetizable material to store digital data. The server storage device 46 is in electrical communication with the server controller 42.

As discussed above, each of the first remote server system 40*a*, the second remote server system 40*b*, the third remote server system 40*c*, and the fourth remote server system 40*d* are configured with different performance (i.e., computing and storage) capabilities. In an exemplary embodiment, the first remote server system 40*a*, the second remote server system 40*b*, the third remote server system 40*c*, and the fourth remote server system 40*d* have different hardware configurations.

In a non-limiting example, to facilitate high-throughput performance, one or more of the first remote server system 40*a*, the second remote server system 40*b*, the third remote server system 40*c*, and the fourth remote server system 40*d* has multiple server controllers 42 operating in parallel and/or multiple server communication systems 44 operating in parallel. In a non-limiting example, to facilitate low-latency performance, one or more of the first remote server system 40*a*, the second remote server system 40*b*, the third remote server system 40*c*, and the fourth remote server system 40*d* is equipped with a server controller 42 having a server processor 48 having a higher clock-speed and/or a server communication system 44 capable of low-latency communication.

In an exemplary embodiment, the cloud computing server system 24 is located in a regional datacenter. The edge computing server system 26 is located closer to the vehicle 12, for example, in a local datacenter, thus allowing for lower-latency network communication. In a non-limiting example, each of the first remote server system 40*a*, the second remote server system 40*b*, the third remote server system 40*c*, and the fourth remote server system 40*d* may be equipped with additional software and/or hardware components such as, for example, a load balancer and/or an autoscaler, allowing the first remote server system 40*a*, the second remote server system 40*b*, the third remote server system 40*c*, and the fourth remote server system 40*d* to adapt to changing computing and/or network load conditions. It should be understood that any hardware and/or software configurations suitable to provide the first remote server system 40*a*, the second remote server system 40*b*, the third remote server system 40*c*, and the fourth remote server system 40*d* having different performance capabilities, as described above, are within the scope of the present disclosure.

In an exemplary embodiment, the vehicle controller 18 is configured to perform computing tasks related to operation of the vehicle 12, such as, for example, computer vision tasks (e.g., object recognition of objects in the environment surrounding the vehicle 12), video processing tasks (e.g., video encoding, video compression, and/or the like), natural language processing tasks (e.g., parsing and interpretation of traffic sign text), voice recognition tasks, navigation routing tasks, automated driving path planning tasks, and/or the like. In a non-limiting example, the vehicle controller 18 uses the plurality of vehicle sensors 22 to perform measurements and gather data related to the computing tasks. In an exemplary embodiment, it is advantageous to offload execution of one or more computing tasks from the vehicle controller 18 to the plurality of remote server systems 16.

Accordingly, the vehicle controller 18 is configured to generate an offloading request. The offloading request includes one or more task constraints for a computing task and a task configuration of the computing task. The one or more task constraints define minimum and/or maximum parameters of the computing task. For example, for a video processing task, the one or more task constraints include a minimum frame size (e.g., 1280×720), a minimum bit depth (e.g., 8 bits), a minimum framerate (e.g., 8 frames per second), and a maximum end-to-end roundtrip latency for the computing task (e.g., 120 milliseconds). In the scope of the present disclosure, the end-to-end roundtrip latency is a total time required for completion of the computing task, measured from transmittal of the computing task at the vehicle communication system 20 to receipt of a result of the computing task (e.g., an encoded video file) at the vehicle communication system 20. The one or more task constraints further include one or more allowed criticality levels for the computing task, as will be discussed in greater detail below. In the scope of the present disclosure, the criticality level denotes how time-critical the computing task is.

The task configuration of the computing task includes metadata about the computing task and parameters for completion of the computing task. When the vehicle controller 18 initially generates an offloading request, the task configuration is a preferred task configuration. As will be discussed in greater detail below, the task configuration may be modified in order to satisfy the one or more task constraints. In a non-limiting example, for a video processing task, the task configuration includes a length of the video (e.g., 3 seconds), a frame size (e.g., 1920×1080), a bit depth (e.g., 24 bits), and a framerate (e.g., 10 frames per second).

Figure 2:
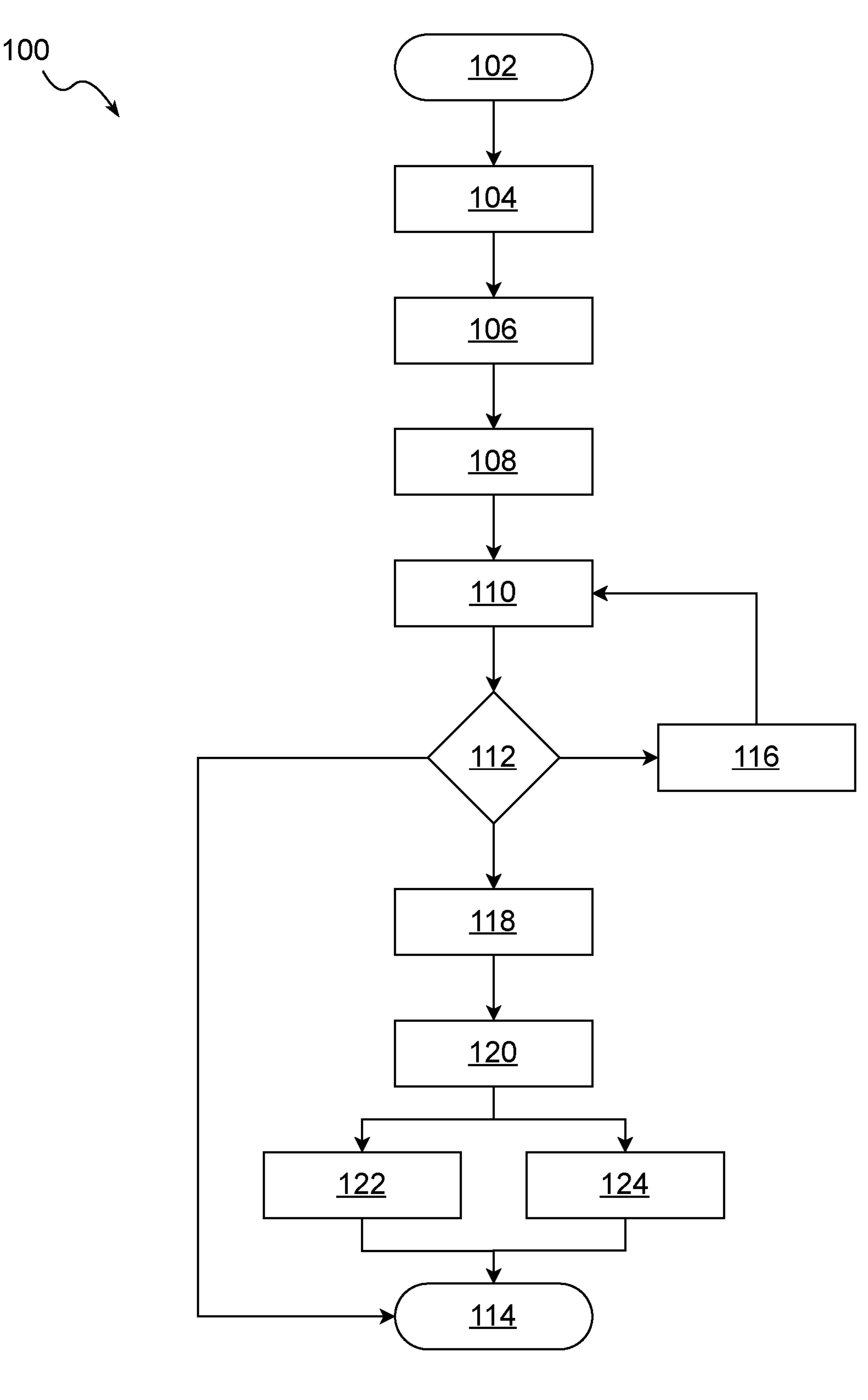
FIG. 2 is a flowchart of a method for allocating computing resources for a vehicle, according to an exemplary embodiment.

Referring to FIG. 2, a flowchart of the method 100 for allocating computing resources for the vehicle 12 is shown. The method 100 begins at block 102 and proceeds to block 104. At block 104, the plurality of remote server systems 16 is used to train a global offloading machine learning model. In the scope of the present disclosure, the global offloading machine learning model is a machine learning model which is configured to receive an offloading request and performance data as an input and predict an end-to-end roundtrip latency for the computing task, a Boolean value denoting whether offloading is possible, and a modified task configuration. In the scope of the present disclosure, the performance data includes historical task performance data (e.g., historical end-to-end roundtrip latencies of computing tasks based on their task configuration), current network performance data (e.g., signal strength, bandwidth usage, packet loss rate, packet retransmission rate, throughput, latency, jitter, uptime, and/or the like), and historical network performance data. In the scope of the present disclosure, offloading may not be possible in certain conditions, such as, for example, if network performance is degraded and/or if the one or more task constraints exceed the performance capabilities of the plurality of remote server systems 16. The modified task configuration is a change to the task configuration to optimize offloading. For example, the modified task configuration may include performing the video processing task with a reduced framerate (e.g., 9 frames per second instead of 10 frames per second) in order to reduce the end-to-end roundtrip latency of the video processing task.

In a non-limiting example, the global offloading machine learning model includes multiple layers, including an input layer and an output layer, as well as one or more hidden layers. The input layer receives an offloading request and performance data as inputs. The inputs are then passed on to the hidden layers. Each hidden layer applies a transformation (e.g., a non-linear transformation) to the data and passes the result to the next hidden layer until the final hidden layer. The output layer produces the end-to-end roundtrip latency for the computing task, the Boolean value denoting whether offloading is possible, and the modified task configuration.

In an exemplary embodiment, the global offloading machine learning model is trained using one of the plurality of remote server systems 16, for example, the cloud computing server system 24. The global offloading machine learning model is trained using global performance data. In the scope of the present disclosure, global performance data includes historical global task performance data (e.g., historical end-to-end roundtrip latencies of computing tasks sent from a plurality of vehicles), current global network performance data (e.g., signal strength, bandwidth usage, packet loss rate, packet retransmission rate, throughput, latency, jitter, uptime, and/or the like for network connections between the plurality of remote server systems 16 and the plurality of vehicles), and historical global network performance data for network connections between the plurality of remote server systems 16 and the plurality of vehicles.

To train the global offloading machine learning model, a dataset of inputs and their corresponding end-to-end roundtrip latency, Boolean value denoting whether offloading is possible, and modified task configuration is used. The model is trained by adjusting internal weights between nodes in each hidden layer to minimize prediction error. During training, an optimization technique (e.g., gradient descent) is used to adjust the internal weights to reduce the prediction error. The training process is repeated with the entire dataset until the prediction error is minimized, and the resulting trained model is then used to process new input data.

After sufficient training of the global offloading machine learning model, the model is capable of more accurately and precisely estimating the end-to-end roundtrip latency, the Boolean value denoting whether offloading is possible, and the modified task configuration based on an offloading request and performance data. By adjusting the weights between the nodes in each hidden layer during training, the model "learns" to recognize patterns in the data that are indicative of the end-to-end roundtrip latency, the Boolean value denoting whether offloading is possible, and the modified task configuration.

It should be understood that the global offloading machine learning model may be configured to receive additional data as input, such as, for example, environmental data (e.g., location of the vehicle 12, weather conditions, and/or the like) without departing from the scope of the present disclosure. After training, the global offloading machine learning model is transmitted (i.e., deployed) from the one of the plurality of remote server systems 16 (e.g., the cloud computing server system 24) to the vehicle controller 18 (i.e., using the server communication system 44 and the vehicle communication system 20). After block 104, the method 100 proceeds to block 106.

At block 106, the vehicle controller 18 receives the global offloading machine learning model and trains a vehicle specific offloading machine learning model. In an exemplary embodiment, the vehicle specific offloading machine learning model is trained using remote learning. In an exemplary embodiment, remote learning includes, for example, federated learning. In the scope of the present disclosure, federated learning involves refining a global model using a local dataset. Accordingly, the vehicle specific offloading machine learning model is trained by refining the global offloading machine learning model using vehicle specific performance data. In the scope of the present disclosure, vehicle specific performance data includes historical vehicle specific task performance data (e.g., historical end-to-end roundtrip latencies of computing tasks sent from the vehicle 12 specifically, such as, for example, a plurality of end-to-end roundtrip latencies of previously completed computing tasks from the vehicle 12), current vehicle specific network performance data (e.g., signal strength, bandwidth usage, packet loss rate, packet retransmission rate, throughput, latency, jitter, uptime, and/or the like for a connection between the plurality of remote server systems 16 and the vehicle 12), and historical vehicle specific network performance data for the connection between the plurality of remote server systems 16 and the vehicle 12. It should be understood that the vehicle specific performance data may be unique to each individual vehicle due to multiple factors, for example, typical use area of the each individual vehicle, hardware configuration of each individual vehicle, and/or the like.

In an exemplary embodiment, after training the vehicle specific offloading machine learning model, the vehicle controller 18 compares a performance of the vehicle specific offloading machine learning model to a performance of the global offloading machine learning model. In a non-limiting example, the vehicle controller 18 uses historical data to compare the performance of the vehicle specific offloading machine learning model to the performance of the global offloading machine learning model. Based on the comparison, the vehicle controller 18 uses the vehicle specific offloading machine learning model or the global offloading machine learning model, whichever is more accurate.

In an exemplary embodiment, the vehicle specific offloading model training is only performed under certain conditions, for example, when there is a low computing load on the vehicle controller 18, when the vehicle 12 is parked and connected to a power source, and/or the like. After block 106, the method 100 proceeds to block 108.

At block 108, the vehicle controller 18 creates the offloading request for the computing task, including the one or more task constraints for the computing task and the task configuration of the computing task, as discussed above. After block 108, the method 100 proceeds to block 110.

At block 110, the vehicle controller 18 determines a predicted performance of the computing task using the vehicle specific offloading machine learning model generated at block 106. The vehicle specific offloading machine learning model is configured to receive the one or more task constraints of the computing task, the task configuration of the computing task, and the vehicle specific performance data as inputs, and provide the predicted performance of the computing task and the modified task configuration as output. In the scope of the present disclosure, the predicted performance of the computing task includes a predicted end-to-end roundtrip latency for the computing task and a predicted Boolean value denoting whether offloading is possible. After block 110, the method 100 proceeds to block 112.

At block 112, the predicted performance of the computing task is compared to the one or more task constraints of the computing task. If the predicted Boolean value denoting whether offloading is possible is false (i.e., offloading is not possible), the method 100 proceeds to enter a standby state at block 114. If the predicted end-to-end roundtrip latency is greater than the maximum end-to-end roundtrip latency in the one or more task constraints (i.e., the predicted performance of the computing task does not satisfy the one or more task constraints), the method 100 proceeds to block 116. If the predicted end-to-end roundtrip latency is less than or equal to the maximum end-to-end roundtrip latency in the one or more task constraints, the method 100 proceeds to block 118.

At block 116, the vehicle controller 18 modifies the task configuration based on the modified task configuration determined at block 110 in response to determining that the predicted performance of the computing task does not satisfy the one or more task constraints. In a non-limiting example, the modified task configuration includes reducing the framerate of a video processing task, as discussed above. After block 116, the method 100 returns to block 110, such that the vehicle controller 18 may determine a predicted performance of the computing task based on the modified task configuration. Blocks 110, 112, and 116 are repeated until an optimal task configuration is identified. In the scope of the present disclosure, the optimal task configuration is a task configuration providing an optimal tradeoff between predicted performance, a quality of the result of the computing task, and resource allocation for the computing task.

At block 118, the vehicle controller 18 determines a criticality level of the computing task. In the scope of the present disclosure, the criticality level denotes how time-critical the computing task is. In some examples, the criticality level may also indicate how operationally critical the computing task is. For example, if a computing task is related to a safety operation of the vehicle 12, the computing task may be considered to be extremely operationally critical regardless of time-criticality. In an exemplary embodiment, the criticality level of the computing task includes at least one of: a low criticality level, a normal criticality level, a high criticality level, and a very high criticality level. Low criticality level computing tasks must be completed within seconds. Normal criticality level computing tasks must be completed within hundreds of milliseconds. High criticality level computing tasks must be completed within tens of milliseconds. Very high criticality level computing tasks must be completed within milliseconds (i.e., less than ten milliseconds).

Therefore, at block 118, if the computing task has a predicted performance indicating a predicted end-to-end roundtrip latency on the order of seconds (i.e., greater than or equal to 999 milliseconds), the criticality level of the computing task is determined to be the low criticality level. If the computing task has a predicted performance indicating a predicted end-to-end roundtrip latency on the order of hundreds of milliseconds (i.e., less than or equal to 999 milliseconds and greater than 99 milliseconds), the criticality level of the computing task is determined to be the normal criticality level. If the computing task has a predicted performance indicating a predicted end-to-end roundtrip latency on the order of tens of milliseconds (i.e., less than or equal to 99 milliseconds and greater than 9 milliseconds), the criticality level of the computing task is determined to be the high criticality level. If the computing task has a predicted performance indicating a predicted end-to-end roundtrip latency on the order of milliseconds (i.e., less than or equal to 9 milliseconds), the criticality level of the computing task is determined to be the very high criticality level. It should be understood that other methods for determining the criticality level, including, for example, a machine learning model trained to determine criticality level based on multiple factors, are within the scope of the present disclosure.

In an exemplary embodiment, at block 118, the vehicle controller 18 compares the criticality level of the computing task to the allowed criticality level in the one or more task constraints of the computing task. If the criticality level of the computing task does not satisfy the allowed criticality level in the one or more task constraints of the computing task, the criticality level is modified. In a non-limiting example, if the criticality level is higher than the allowed criticality level in the one or more task constraints of the computing task, the criticality level is reduced to the maximum allowed criticality level in the one or more task constraints of the computing task. If the criticality level is lower than the allowed criticality level in the one or more task constraints of the computing task, the criticality level is increased to the minimum allowed criticality level in the one or more task constraints of the computing task. After block 118, the method 100 proceeds to block 120.

At block 120, the vehicle controller 18 routes the computing task to one of the plurality of remote server systems 16. In an exemplary embodiment, the computing task is routed based at least in part on the criticality level of the computing task. In a non-limiting example, the computing task is routed to the first remote server system 40*a* in response to determining that the criticality level of the computing task is the low criticality level. The computing task is routed to the second remote server system 40*b* in response to determining that the criticality level of the computing task is the normal criticality level. The computing task is routed to the third remote server system 40*c* in response to determining that the criticality level of the computing task is the medium criticality level. The computing task is routed to the third remote server system 40*c* in response to determining that the criticality level of the computing task is the high criticality level. The computing task is routed to the fourth remote server system 40*d* in response to determining that the criticality level of the computing task is the very high criticality level. In a non-limiting example, the vehicle controller 18 uses the vehicle communication system 20 to wirelessly transmit the computing task, including the task configuration and any additional data needed to complete the computing task (e.g., video source files for a video processing computing task) for receipt by the server communication system 44 of one of the plurality of remote server systems 16. After block 120, the method 100 proceeds to blocks 122 and 124.

At block 122, the vehicle controller 18 receives the result of the computing task from one of the plurality of remote server systems 16 using the vehicle communication system 20. In a non-limiting example, for a computer vision task, the result includes locations and classifications of objects recognized in the environment surrounding the vehicle 12. In another non-limiting example, for a video processing task, the result includes an encoded video file. In another non-limiting example, for an automated driving path planning task, the result includes a sequence of waypoints in the environment surrounding the vehicle 12 forming a path for the vehicle 12 to follow. After block 122, the method 100 proceeds to enter the standby state at block 114.

At block 124, the vehicle controller 18 records actual performance metrics for the computing task. In an exemplary embodiment, actual performance metrics include an actual end-to-end roundtrip latency of the computing task, network conditions at the time of receipt of the result of the computing task, and environmental conditions at the time of receipt of the result of the computing task. In a non-limiting example, the actual performance metrics are determined by the vehicle controller 18 using the vehicle communication system 20 and the plurality of vehicle sensors 22. The actual performance metrics are saved as part of the vehicle specific performance data, including the historical vehicle specific task performance data and the historical vehicle specific network performance data. In an exemplary embodiment, the actual performance metrics are saved in the media 30 of the vehicle controller 18.

Additionally, at block 124, the vehicle controller 18 uses the vehicle communication system 20 to transmit the actual performance metrics to one or more of the plurality of remote server systems 16, such that the actual performance metrics are added to the historical global task performance data stored in the server storage device 46 of one or more of the plurality of remote server systems 16, including the historical global task performance data and the historical global network performance data. After block 124, the method 100 proceeds to enter the standby state at block 114.

In an exemplary embodiment, the vehicle controller 18 repeatedly exits the standby state 114 and restarts the method 100 at block 102. In a non-limiting example, the vehicle controller 18 exits the standby state 114 and restarts the method 100 on a timer, for example, every three hundred milliseconds.

Figure 3:
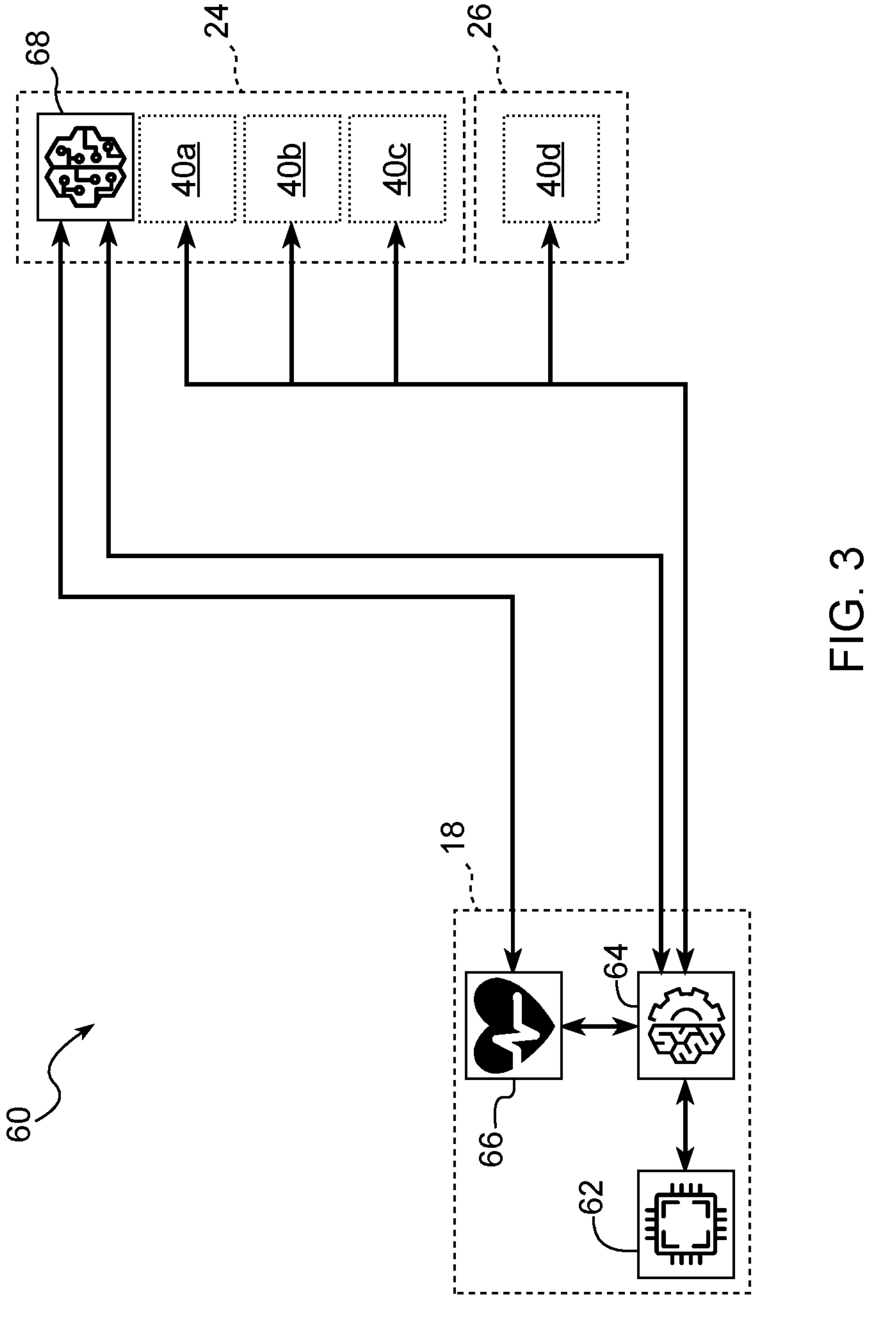
FIG. 3 is a schematic diagram of an exemplary software architecture for performing the method for allocating computing resources for a vehicle, according to an exemplary embodiment.

Referring to FIG. 3, a schematic diagram of an exemplary software architecture 60 for the performing the method 100 using the system 10 is shown. As discussed above, in an exemplary embodiment, the method 100 is executed using the system 10. In a non-limiting example, the vehicle controller 18 and the server controllers 42 of the remote server systems 16 are configured with a set of computer-executable instructions (i.e., a computer program) to execute the method 100. The set of computer-executable instructions may be written according to any programming paradigm, including, for example, a functional programming paradigm, an imperative programming paradigm, an object-oriented programming paradigm, and/or the like. Furthermore, the set of computer-executable instructions may be written using any computer programming language.

The exemplary software architecture 60 is an example of an organizational structure for the set of computer-executable instructions. The exemplary software architecture 60 includes multiple software modules. In the scope of the present disclosure, software modules represent independent software components which are capable of receiving input data, performing operations on the input data according to computer-executable instructions, storing intermediate values (i.e., variables), and providing output data. In a non-limiting example, the software modules are programmatically implemented as functions, methods, subprograms, subroutines, and/or the like. In an exemplary embodiment, one or more of the software modules is configured to run in a non-blocking manner, meaning that failure or suspension of any one software module does not cause failure or suspension of any other software module. In a non-limiting example, one or more of the software modules are executed concurrently on separate threads of the vehicle controller 18 and/or the server controller 42.

Referring again to FIG. 3, in the exemplary software architecture 60, the vehicle controller 18 executes a task handler module 62, an offloading optimizer module 64, and a performance monitor module 66. The task handler module 62 is configured to coordinate execution of computing tasks. As discussed above, the computing tasks may include, for example, computer vision tasks, video processing tasks, natural language processing tasks, navigation routing tasks, automated driving path planning tasks, and/or the like. The task handler module 62 allocates computing resources of the vehicle controller 18 to perform the computing tasks. In some examples, it is advantageous to offload one or more computing tasks to the plurality of remote server systems 16. Therefore, the task handler module 62 is configured to generate offloading requests, as discussed above in reference to block 108 of the method 100. The task handler module 62 then transmits the offloading requests to the offloading optimizer module 64.

The offloading optimizer module 64 is configured to receive the offloading requests from the task handler module 62. The offloading optimizer module 64 is further configured to train and execute the vehicle specific offloading machine learning model, as discussed above in reference to blocks 106 and 110. Furthermore, the offloading optimizer module 64 is further configured to modify the task configuration and return the modified task configuration to the task handler module 62, as discussed above in reference to block 116 of the method 100. The offloading optimizer module 64 is in communication with the first remote server system 40*a*, the second remote server system 40*b*, the third remote server system 40*c*, and the fourth remote server system 40*d*. The offloading optimizer module 64 is further configured to route the computing tasks to one of the first remote server system 40*a*, the second remote server system 40*b*, the third remote server system 40*c*, and the fourth remote server system 40*d*, as discussed above in reference to block 120 of the method 100. The offloading optimizer module 64 is further configured to receive the result of the computing task from one of the first remote server system 40*a*, the second remote server system 40*b*, the third remote server system 40*c*, and the fourth remote server system 40*d* and transmit the result of the computing task to the task handler module 62, as discussed above in reference to block 122 of the method 100. The offloading optimizer module 64 is in communication with the performance monitor module 66.

The performance monitor module 66 is configured to record and aggregate the vehicle specific performance data, including the historical vehicle specific task performance data, the current vehicle specific network performance data, and the historical vehicle specific network performance data. In some examples the performance monitor module 66 also records and aggregates the global performance data. The performance monitor module 66 is in communication with the offloading optimizer module 64. The performance monitor module 66 is configured to provide the vehicle specific performance data to the offloading optimizer module 64.

The plurality of remote server systems 16 executes an offloading continuous learning module 68. In an exemplary embodiment, the offloading continuous learning module 68 is executed by the cloud computing server system 24. In a non-limiting example, the offloading continuous learning module 68 is executed by one or more of the first remote server system 40*a*, the second remote server system 40*b*, and the third remote server system 40*c*. In another non-limiting example, the offloading continuous learning module 68 is executed by a separate remote server system within the cloud computing server system 24. The offloading continuous learning module 68 is configured to train the global offloading machine learning model, as discussed above in reference to block 104 of the method 100. The offloading continuous learning module 68 is in communication with the performance monitor module 66 to receive the global performance data for use in training of the global offloading machine learning model. The offloading continuous learning module 68 also periodically receives vehicle specific performance data from the performance monitor module 66 to use in updating the global performance data. The offloading continuous learning module 68 is in communication with the offloading optimizer module 64 to provide the global offloading machine learning model to the offloading optimizer module 64. The offloading continuous learning module 68 is further configured to periodically update the global offloading machine learning model and transmit the updated global offloading machine learning model to the offloading optimizer module 64.

It should be understood that the exemplary software architecture 60 is merely exemplary in nature. Any configuration of the system 10 suitable to perform the method 100 is within the scope of the present disclosure.

The system 10 and method 100 of the present disclosure offer several advantages. Using the system 10 and the method 100, computing resources of the vehicle controller 18 and the plurality of remote server systems 16 are efficiently allocated to computing tasks. Using the vehicle specific offloading machine learning model, the task configuration of the computing task is modified based multiple factors, such as, for example, current and past network performance. The use of remote learning allows the global offloading machine learning model to be customized or adapted to the vehicle 12, such that the vehicle specific offloading machine learning model accounts for factors particular to the vehicle 12, such as, for example, cell signal strength and connection quality in the environment surrounding the vehicle 12. The use of the plurality of remote server systems 16 having differing performance capabilities allows for routing of computing tasks to minimize resource consumption.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method for allocating computing resources for a vehicle, the method comprising:

determining an optimal task configuration for a computing task based at least in part on a task constraint of the computing task, wherein determining the optimal task configuration further comprises:

determining a predicted performance of the computing task based at least in part on a task configuration of the computing task, wherein determining the predicted performance of the computing task further comprises:

training a vehicle specific offloading machine learning model, wherein training the vehicle specific offloading machine learning model further comprises:

training a global offloading machine learning model based at least in part on historical global task performance data, wherein the global offloading machine learning model is trained using one of a plurality of remote server systems;

deploying the global offloading machine learning model from the one of the plurality of remote server systems to a vehicle controller of the vehicle; and training the vehicle specific offloading machine learning model based at least in part on the global offloading machine learning model using the vehicle controller, wherein the vehicle specific offloading machine learning model is trained using remote learning, wherein training the vehicle specific offloading machine learning model based at least in part on the global offloading machine learning model further comprises:

training the global offloading machine learning model with historical vehicle specific task performance data to produce the vehicle specific offloading machine learning model, wherein the historical global task performance data includes at least one of: a plurality of end-to-end roundtrip latencies of previously completed computing tasks from a plurality of vehicles and network performance data for a plurality of network connections between the plurality of vehicles and the plurality of remote server systems, and wherein the historical vehicle specific task performance data includes at least one of: a plurality of end-to-end roundtrip latencies of previously completed computing tasks from the vehicle and network performance data for a network connection between the vehicle and the plurality of remote server systems;

determining the predicted performance of the computing task using the vehicle specific offloading machine learning model, wherein the vehicle specific offloading machine learning model is configured to receive the task configuration of the computing task and historical vehicle specific task performance data as an input, and wherein the vehicle specific offloading machine learning model is configured to provide the predicted performance of the computing task as an output;

comparing the predicted performance of the computing task to the task constraint of the computing task;

modifying the task configuration of the computing task in response to determining that the predicted performance of the computing task does not satisfy the task constraint of the computing task; and repeating the determining the predicted performance step, the comparing the predicted performance step, and the modifying the task configuration step until the optimal task configuration is identified, wherein the predicted performance of the computing task with the optimal task configuration satisfies the task constraint of the computing task;

determining a criticality level of the computing task based at least in part on the optimal task configuration and the task constraint of the computing task; and routing the computing task to one of the plurality of remote server systems based at least in part on the criticality level of the computing task.

2. The method of claim 1, wherein modifying the task configuration of the computing task further comprises:

modifying the task configuration of the computing task using the vehicle specific offloading machine learning model, wherein the vehicle specific offloading machine learning model is further configured to receive the task constraint of the computing task as the input and provide a modified task configuration for the computing task as the output.

3. The method of claim 1, wherein determining the criticality level of the computing task further comprises:

determining the criticality level of the computing task based at least in part on the predicted performance of the computing task with the optimal task configuration, wherein the criticality level includes one of: a low criticality level, a normal criticality level, a high criticality level, and a very high criticality level;

comparing the criticality level to an allowed criticality level of the task constraint; and modifying the criticality level in response to determining that the criticality level does not satisfy the allowed criticality level.

4. The method of claim 3, wherein routing the computing task to one of the plurality of remote server systems further comprises:

routing the computing task to a first of the plurality of remote server systems in response to determining that the criticality level of the computing task is the low criticality level, wherein the first of the plurality of remote server systems is configured to provide a first throughput and a first latency;

routing the computing task to a second of the plurality of remote server systems in response to determining that the criticality level of the computing task is the normal criticality level, wherein the second of the plurality of remote server systems is configured to provide the first throughput and a second latency, and wherein the second latency is less than the first latency;

routing the computing task to a third of the plurality of remote server systems in response to determining that the criticality level of the computing task is the high criticality level, wherein the third of the plurality of remote server systems is configured to provide a second throughput and the second latency, and wherein the second throughput is less than the first throughput; and routing the computing task to a fourth of the plurality of remote server systems in response to determining that the criticality level of the computing task is the very high criticality level, wherein the fourth of the plurality of remote server systems is configured to provide the second throughput and a third latency, and wherein the third latency is less than the second latency.

5. The method of claim 1, wherein the task constraint of the computing task includes at least a maximum end-to-end roundtrip latency for the computing task.

6. A system for allocating computing resources for a vehicle, the system comprising:

a plurality of remote server systems, wherein the plurality of remote server systems further comprises a first remote server system configured to provide a first throughput and a first latency, a second remote server system configured to provide the first throughput and a second latency, wherein the second latency is less than the first latency, a third remote server system configured to provide a second throughput and the second latency, wherein the second throughput is less than the first throughput, and a fourth remote server system configured to provide the second throughput and a third latency, wherein the third latency is less than the second latency; and a vehicle system including:

a vehicle communication system in wireless communication with the plurality of remote server systems; and a vehicle controller in electrical communication with the vehicle communication system, wherein the vehicle controller is programmed to:

determine an optimal task configuration for a computing task based at least in part on a task constraint of the computing task;

determine a criticality level of the computing task based at least in part on the optimal task configuration and the task constraint of the computing task, wherein to determine the criticality level of the computing task, the vehicle controller is further programmed to:

determine the criticality level of the computing task based at least in part on a predicted performance of the computing task with the optimal task configuration, wherein the criticality level includes one of: a low criticality level, a normal criticality level, a high criticality level, and a very high criticality level; and route the computing task to one of the plurality of remote server systems using the vehicle communication system based at least in part on the criticality level of the computing task, wherein to route the computing task, the vehicle controller is further programmed to:

route the computing task to the first remote server system in response to determining that the criticality level of the computing task is the low criticality level;

route the computing task to the second remote server system in response to determining that the criticality level of the computing task is the normal criticality level;

route the computing task to the third remote server system in response to determining that the criticality level of the computing task is the high criticality level; and route the computing task to the fourth remote server system in response to determining that the criticality level of the computing task is the very high criticality level.

7. The system of claim 6, wherein to determine the optimal task configuration, the vehicle controller is further programmed to:

determine a predicted performance of the computing task using a vehicle specific offloading machine learning model, wherein the vehicle specific offloading machine learning model is configured to receive a task configuration of the computing task and historical vehicle specific task performance data as an input, and wherein the vehicle specific offloading machine learning model is configured to provide the predicted performance of the computing task as an output;

compare the predicted performance of the computing task to the task constraint of the computing task; and modify the task configuration of the computing task in response to determining that the predicted performance of the computing task does not satisfy the task constraint of the computing task.

8. The system of claim 7, wherein to modify the task configuration of the computing task, the vehicle controller is further programmed to:

modify the task configuration of the computing task using the vehicle specific offloading machine learning model, wherein the vehicle specific offloading machine learning model is further configured to receive the task constraint of the computing task as the input and provide a modified task configuration for the computing task as the output.

9. The system of claim 7, wherein the plurality of remote server systems includes at least one server controller and at least one server communication system in electrical communication with the at least one server controller, and wherein the at least one server controller is programmed to:

train a global offloading machine learning model based at least in part on historical global task performance data; and transmit the global offloading machine learning model from the at least one server controller to the vehicle communication system using the at least one server communication system.

10. The system of claim 9, wherein the vehicle controller is further programmed to:

receive the global offloading machine learning model using the vehicle communication system; and train the vehicle specific offloading machine learning model based at least in part on the global offloading machine learning model using the vehicle controller, wherein the vehicle specific offloading machine learning model is trained using remote learning.

11. A system for allocating computing resources for a vehicle, the system comprising:

a plurality of remote server systems including:

a server communication system; and a server controller in electrical communication with the server communication system, wherein the server controller is programmed to:

train a global offloading machine learning model based at least in part on historical global task performance data; and transmit the global offloading machine learning model using the server communication system; and a vehicle system including:

a vehicle communication system in wireless communication with the server communication system; and a vehicle controller in electrical communication with the vehicle communication system, wherein the vehicle controller is programmed to:

receive the global offloading machine learning model using the vehicle communication system;

train a vehicle specific offloading machine learning model based at least in part on the global offloading machine learning model using the vehicle controller;

determine an optimal task configuration for a computing task using the vehicle specific offloading machine learning model based at least in part on a task constraint of the computing task, wherein to determine the optimal task configuration, the vehicle controller is further programmed to:

determine a predicted performance of the computing task using the vehicle specific offloading machine learning model, wherein the vehicle specific offloading machine learning model is configured to receive a task configuration of the computing task and historical vehicle specific task performance data as an input, and wherein the vehicle specific offloading machine learning model is configured to provide the predicted performance of the computing task as an output;

compare the predicted performance of the computing task to the task constraint of the computing task; and modify the task configuration of the computing task in response to determining that the predicted performance of the computing task does not satisfy the task constraint of the computing task, wherein the task configuration of the computing task is modified using the vehicle specific offloading machine learning model, wherein the vehicle specific offloading machine learning model is further configured to receive the task constraint of the computing task as the input and provide a modified task configuration for the computing task as the output;

determine a criticality level of the computing task based at least in part on the optimal task configuration and the task constraint of the computing task, wherein the criticality level includes one of: a low criticality level, a normal criticality level, a high criticality level, and a very high criticality level; and route the computing task to one of the plurality of remote server systems using the vehicle communication system based at least in part on the criticality level of the computing task.

12. The system of claim 11, wherein the plurality of remote server systems further comprises a first remote server system configured to provide a first throughput and a first latency, a second remote server system configured to provide the first throughput and a second latency, wherein the second latency is less than the first latency, a third remote server system configured to provide a second throughput and the second latency, wherein the second throughput is less than the first throughput, and a fourth remote server system configured to provide the second throughput and a third latency, wherein the third latency is less than the second latency, and wherein to route the computing task, the vehicle controller is further programmed to:

route the computing task to the first remote server system in response to determining that the criticality level of the computing task is the low criticality level;

route the computing task to the second remote server system in response to determining that the criticality level of the computing task is the normal criticality level;

route the computing task to the third remote server system in response to determining that the criticality level of the computing task is the high criticality level; and route the computing task to the fourth remote server system in response to determining that the criticality level of the computing task is the very high criticality level.

* * * * *